United States Patent [19]

Granzow et al.

[11] Patent Number: 4,617,457

[45] Date of Patent: Oct. 14, 1986

[54] TELLER-ASSISTED, CUSTOMER-OPERATED ATM DOCUMENT CASHING SYSTEM

[75] Inventors: Robert H. Granzow, Miamisburg; Kimbrough I. Myers, Kettering, both of Ohio

[73] Assignee: NCR Corporation, Dayton, Ohio

[21] Appl. No.: 562,786

[22] Filed: Dec. 19, 1983

[51] Int. Cl.[4] ............................................. G06F 15/30
[52] U.S. Cl. .................................................... 235/379
[58] Field of Search ........................................ 235/379

[56] References Cited

U.S. PATENT DOCUMENTS

| | | | |
|---|---|---|---|
| 3,876,864 | 4/1975 | Clark et al. | 235/61.7 B |
| 3,949,364 | 4/1976 | Clark et al. | 340/147 A |
| 4,109,238 | 8/1978 | Creekmore | 340/149 A |
| 4,187,498 | 2/1980 | Creekmore | 340/149 A |
| 4,205,780 | 6/1980 | Burns et al. | 235/454 |
| 4,264,808 | 4/1981 | Owens et al. | 235/375 |

Primary Examiner—Harold I. Pitts
Attorney, Agent, or Firm—Albert L. Sessler, Jr.; Elmer Wargo

[57] ABSTRACT

A document cashing system including a host computer, a plurality of ATMs, and a teller station including a display and keyboard including function keys. Each ATM includes an imager for presenting an image of a check received at the machine to the display at the teller station. The image along with other check data and data about the drawer and drawee of the check are displayed to the teller at the teller station who decides whether to accept or not accept the check for cashing by actuating an appropriate function key on the keyboard. A MICR printer within each ATM prints the monetary amount of the check on the associated check for accepted checks when the associated cash is dispensed to the customer by the ATM.

14 Claims, 8 Drawing Figures

TELLER-ASSISTED, CUSTOMER-OPERATED ATM DOCUMENT CASHING SYSTEM

BACKGROUND OF THE INVENTION

This invention relates generally to automated banking systems, and more particularly, it relates to a system of cashing documents like checks, which system utilizes a customer-operated, automated teller machine (ATM) in cooperation with equipment at a teller station where a human teller also participates in the evaluation of the document itself.

There have been extended efforts in the last decade, for example, to automate banking operations. The ATM mentioned is a prime example of the results of these efforts. The ATM performs the functions of dispensing cash, receiving deposits, transferring funds from savings to checking accounts, for example. One of the functions which ATMs do not generally perform is that of cashing checks.

In general, about 35% of a human teller's transactions at a typical bank amount to cashing checks. A typical ATM which is capable of performing the various functions mentioned, can perform about 63% of the usual functions performed by a human teller; this does not include the cashing of checks.

SUMMARY OF THE INVENTION

In contrast with the above, an ATM in combination with a teller station and a human teller, according to this invention, can handle about 90% of transactions encountered by a human teller instead of the 63% mentioned.

The document cashing system according to this invention comprises a computer including means for storing data associated with users of said system; a machine for performing financial transactions including the dispensing of cash; said machine comprising: means for identifying a user of said machine; means for entering data including the monetary amount about a document to be processed; means for receiving a document to be processed; means for generating image data of the front and back of said document; and means for moving said document received by said receiving means into operative relationship with said image data generating means; said system further comprising: evaluating means to enable a teller in said system to evaluate said document and said user, said evaluating means including a display and a keyboard having function keys thereon; and means for coupling said computer, machine, and evaluating means to enable data associated with said user to be displayed on said display, said coupling means also coupling said image data generating means with said display to enable said image data to be displayed at said display; said dispensing of cash from said machine being initiated in response to an actuation of a selected one of said function keys.

The system of this invention is simple in construction and inexpensive to implement.

These advantages and others will be more readily understood in connection with the following specification, claims, and drawing.

DETAILED DESCRIPTION OF THE INVENTION

Figure 1:
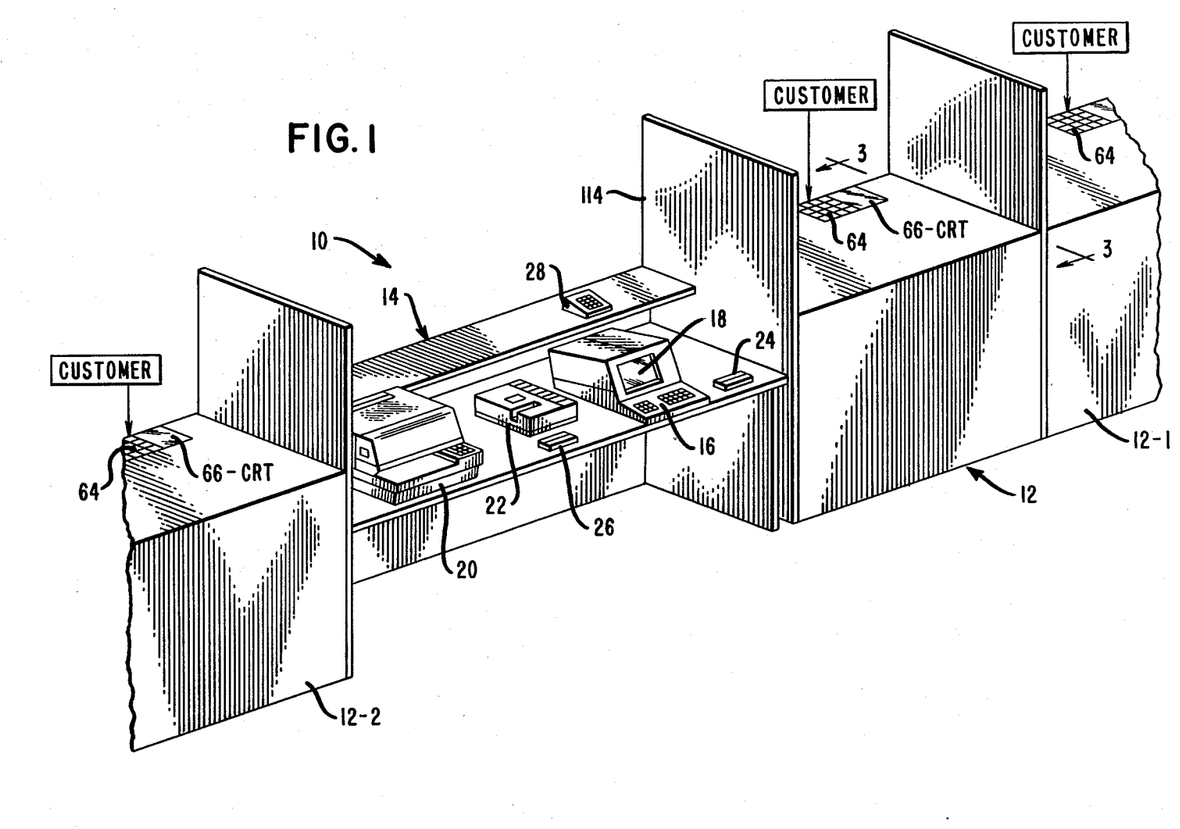
FIG. 1 is a general view, in perspective, showing the apparatus of a preferred embodiment of this invention, which includes, generally, several modified ATMs and a group of business machines commonly referred to as a teller station.

FIG. 1 is a general view, in perspective, of the system 10 for cashing documents like checks according to a preferred embodiment of the invention, showing a modified automated teller machine ATM 12 and a group of financial machines commonly referred to as a teller station 14. The ATM 12 is operated by a customer, and the teller station 14 is operated by a human teller; however, the ATM 12 and the teller station 14 are coupled together as will be described hereinafter, and the teller exerts some control over the ATM 12 which is normally, independently operated by a customer. Before describing the operation of the system 10 in detail, it appear appropriate to discuss the components thereof.

The system 10 includes the teller station 14 which is conventional, such as the NCR 5000 system. The teller station 14 includes: a keyboard 16 such as an NCR 5012-K041 for entering data; a display 18 such as an NCR 5012 which includes a cathode ray tube (CRT) for communicating with a teller; a passbook printer 20 such as an NCR 5022 for printing on passbooks to record deposits to or withdrawals from savings accounts, for example; a journal/voucher printer 22 such as an NCR 5021 for printing on deposit slips, for example; a magnetic stripe or card reader 24 such as an NCR 5012-K080 for reading magnetic strips on cards such as bank identification cards; a conventional magnetic ink character recognition (MICR) reader 26 for reading MICR data on checks, for example; and a PIN pad 28 such as an NCR 5012-K020 to enable a customer to enter certain data, such as a secret identification number. All the equipment described with an NCR prefix is manufactured by and currently available from the NCR Corporation of Dayton, Ohio.

The teller station 14 also includes: a read only memory (ROM) 30 (FIG. 2) for storing certain instructions; a random access memory (RAM) 32 for temporary memory storage; a processor (MP) 34 for executing the instructions; an interface 35 to be later described herein; interface and control logic 36 for interconnecting the various elements associated with the teller station 14, shown in FIG. 2; and a communication module 38 to enable the teller station 14 to communicate with the branch controller 40 over a communication link 42. The communication module 38, for example, is standard such as the 28530 Integrated Circuit which is available from Zilog Corporation. The communication link 42 is conventional, such as the NCR In-House DLS which is a high speed, synchronous, communications format type, and it is used with the communication module 38, for example. The branch controller 40 is conventional such as an NCR 5094 processor or controller which is available from NCR Corporation. The controller 40 includes a communication module 44 (coupled to the communications link 42) by which it communicates with the teller station 14 and the ATM 12; because this aspect is conventional and not important to an understanding of this invention, it is not described in any further detail.

In general, the controller 40 contains the application programs for the various general functions performed by the teller station 14. In this regard, the controller 40 includes a ROM 46 where certain programs or procedures may be stored, a RAM 48 for providing temporary storage for processing data or for storing application programs, and a processor (MP) 50 for executing the instructions and application programs from the ROM 46 or RAM 48. The controller 40 also includes a disc controller 52 which is coupled to the disc storage 54 where extensive data storage may be had. In the embodiment described, the disc storage 54 contains, for example, a data base associated with the bank's customers. The data base may include current monetary balances for the various account numbers, names and addresses of account holders, and personal identification numbers (PIN)s associated with the various account numbers, to name just a few of the types of data included in the data base. The controller 40 also includes a display such as a CRT 56, a keyboard (KB) 58 for manually entering data, and interface and control logic 60 which provide the various connections for the elements shown. The controller 40 may also be connected or coupled to a host computer 62 via the communication module 44.

Figure 2:
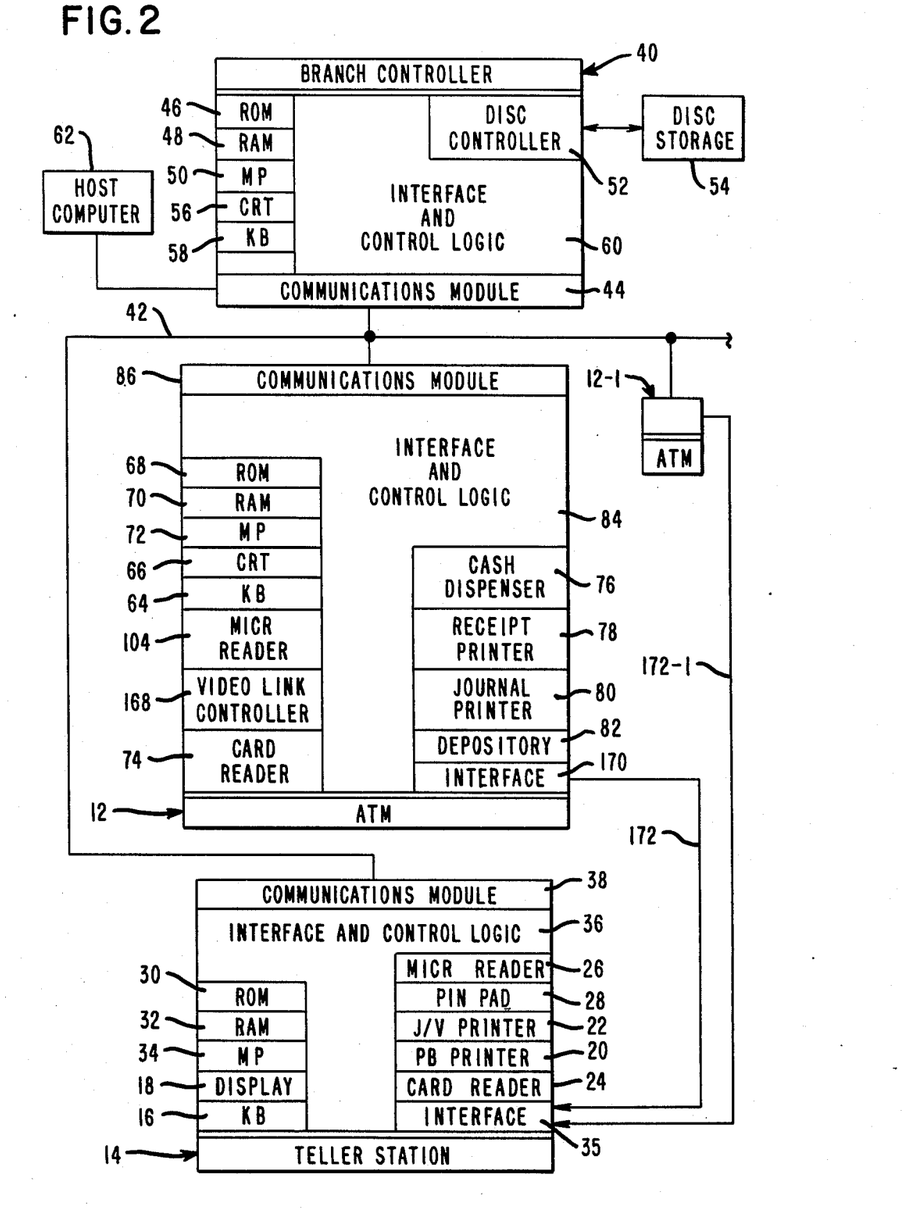
FIG. 2 is a general schematic view showing how the ATMs, a branch controller and the teller station shown in FIG. 1 are connected.

The ATM 12 (FIG. 2) includes: a keyboard 64 for entering data; a display such as CRT 66 for communicating with a customer; a ROM 68 where instructions and routines are stored; a RAM 70 for providing temporary storage; a processor (MP) 72 for executing the instructions; a card reader 74 for reading identification cards associated with the operation of an ATM, a cash dispenser 76 for dispensing bills or currency; a receipt printer 78 for printing receipts to be given to a customer when a deposit, for example, is made using the ATM 12; a journal printer 80 for printing a list of transactions occurring at the ATM 12; a depository 82 for receiving deposit envelopes when deposits are made; interface and control logic 84 for connecting the various components shown in FIG. 2; and a communication module 86 for coupling the ATM 12 to the teller station 14 and the branch controller 40 via the communications link 42.

As previously stated, the ATM 12 is conventional and may be an NCR 1770 ATM which is modified as will be described hereinafter. The ATM 12 is of the type which is mounted inside a bank for use by customers during banking hours. What has been described so far in relation to ATM 12 is included in the standard NCR 1770 ATM mentioned which is modified as shown best in relation to FIG. 3.

Figure 3:
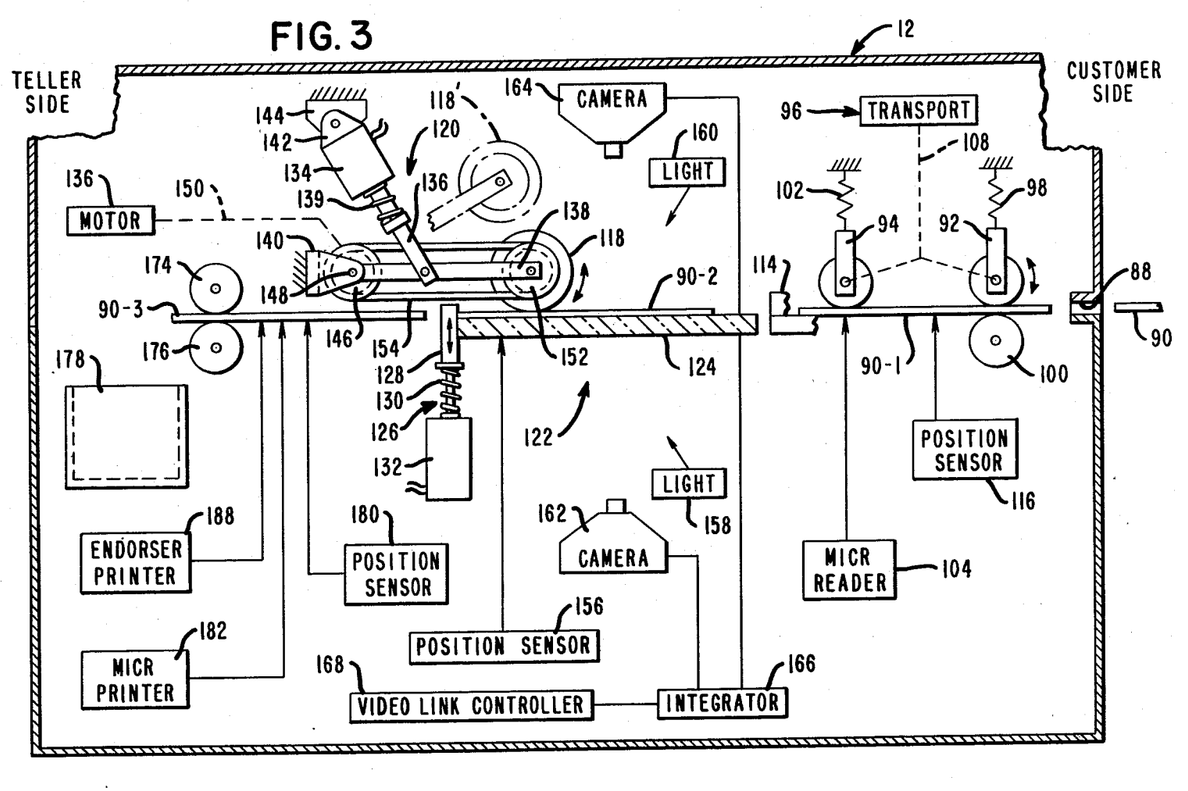
FIG. 3 is a cross-sectional view, taken along the line 3—3 of FIG. 1 to show details of a means for transporting a check to be cashed within an ATM.

FIG. 3 is a cross-sectional view, taken generally along the line 3-3 of FIG. 1, to show additional details of the modified ATM 12 as used in the system 10. The ATM 12 includes a receiving slot 88 (FIG. 3) which is part of the depository 82 (FIG. 2) which is used to receive deposit envelopes which are used in making deposits conventionally to a customer's account. The depository 82 of a conventional ATM has been modified, as will be described hereinafter, to also receive a document like a check 90 which is to be cashed by the system 10.

Figure 4:
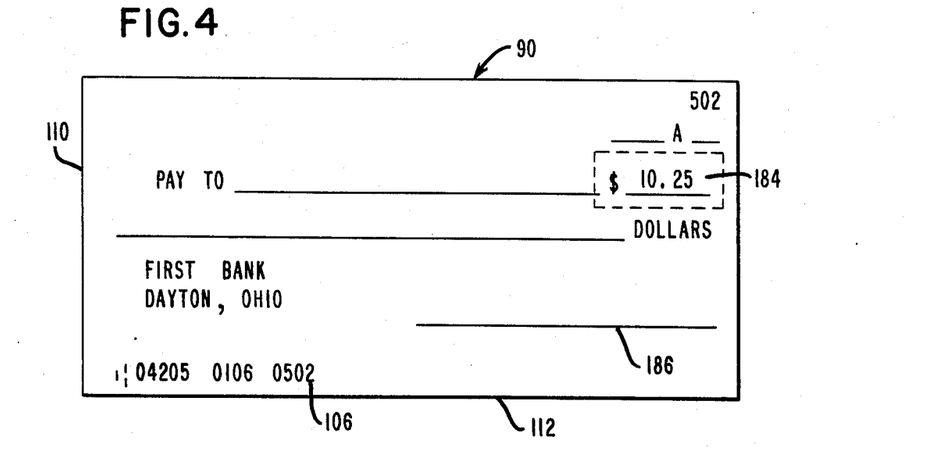
FIG. 4 is a diagram of a document like a check which is processed by the apparatus shown in FIG. 1.

Assume for the moment, that a customer at the ATM 12 wishes to cash a check. Before describing the various procedures involved in operating the ATM 12 to perform a check-cashing function, it appears appropriate to discuss the hardware utilized in performing this function. In this regard, the depository 82 (FIG. 3) includes a plurality of drive rollers like 92 and 94 which are part of a means for transporting a deposit envelope (not shown) or a check 90 within the ATM 12, which transporting means shall be referred to hereinafter as transport 96. Drive roller 92 is biased by a spring 98 to move towards its associated pinch roller 100. Similarly, drive roller 94 is biased by a spring 102 to move the check 90 into operative engagement with a magnetic ink character recognition (MICR) reader 104 which is used to read the MICR line 106 (FIG. 4) on the check 90; however, the MICR line 106 is shown only as regular print in FIG. 4. The transport 96 is conventional and includes a bi-directional drive motor (not shown) which is operatively connected to the drive rollers 92 and 94 by suitable connecting linkage 108. The drive rollers 92 and 94 are mounted with the springs 98 and 102 so as to enable these drive rollers to accommodate deposit envelopes of varying thicknesses or to accommodate a single check 90. When a check 90 is placed in the slot 88, it is placed therein with the front of the check facing down, as viewed in FIG. 3, and with the left edge 110 (FIG. 4) of the check being inserted first into the slot 88. In order to insure that the MICR line 104 on the check 90 is aligned for proper reading relationship with the MICR reader 104, the customer using the ATM 12 is requested (via the CRT 66 in FIG. 1) to insert the check as already described, and in addition, the customer is requested to slide the lower side 112 (FIG. 4) of the check against a guide rail 114 which is aligned with one side of the slot 88. The axes of the drive rollers 92 and 94 may also be canted or displaced slightly (from being perpendicular to the direction of travel of the check) as is done, conventionally, to urge the lower side 112 of the check towards the guide rail 114 as the check is moved to the left as viewed in FIG. 3.

As a check 90 is moved to the left as viewed in FIG. 3, (now referenced as 90-1 to show its new position), it is detected by a position sensor 116 whose output signal is used by the ATM 12 to accept the output of the MICR reader 104 to read the MICR line 106 on the check 90-1 as the check is moved by the transport 96 in operative engagement with the MICR reader 104. The read head (not shown) of the MICR reader 104 is aligned with the drive roller 94 which keeps the check 90-1 in operative engagement therewith as the check is moved. As the MICR data from the check 90-1 is read, it is stored in the RAM 70 of the ATM 12 along with a transaction number which identifies this particular check-cashing transaction and which also provides an audit trail therefor.

From the MICR reader 104, the check 90-1 is moved by the transport 96 and the feed wheel 118 which is part of the means 120 for moving the check (which is now referenced as 90-2) at an imaging station 122 within the ATM 12.

The imaging station 122 (FIG. 3) is the area of the ATM 12 where image data of the front and back of the check 90-2 is generated or obtained and forwarded to the display 18 at the teller station 14 where this image data along with other data is displayed as will be described hereinafter. The imaging station 122 includes a glass, transparent plate 124 over which the check 90-2 is moved into the position shown. A conventional stop gate 126 is used to stop the check 90-2 in the position shown. The stop gate 126 includes a blade 128 which is inserted in the path of the check 90-2 through the biasing of an associated spring 130. When the solenoid 132 of the stop gate 126 is energized, the blade 128 is pulled out of the path of the check 90-2 permitting it to be moved to the left as viewed in FIG. 3.

The moving means 120 (FIG. 3) alluded to earlier herein also includes a solenoid 134 and a bi-directional stepping motor 136. The feed wheel 118, already mentioned, is rotatably mounted on one end of an arm 138 whose remaining end is pivotally mounted on a support 140 to enable the feed wheel 118 to be moved or pivoted between the position shown in solid outline and the position shown in dashed outline as 118'. The operating plunger 136 of the solenoid 134 is pivotally joined to the arm 138 between the arm's ends and a compression spring 139 is used to resiliently bias the feed wheel 118 into engagement with the check 90-2. The solenoid 134 has its end 142 pivotally joined to a support 144 to enable the solenoid 134 to pivot slightly as it moves the feed wheel 118 from the position shown in solid outline to the position shown in dashed outline 118' when the solenoid 134 is energized.

The moving means 120 (FIG. 3) also includes a tandem pulley 146 which is rotatably mounted on a rod 148 on which the arm 138 is pivotally mounted. The output pulley (not shown) of the motor 136 drives one of the pulleys on the tandem pulley 146 via a belt (shown as dashed line 150), and the remaining pulley of the tandem pulley 146 is coupled to a drive pulley 152 (fixed to feed wheel 118) by a belt 154 to rotate feed wheel 118 in either direction depending upon the rotation of motor 136.

When a check like 90-2 is moved from the MICR reader 104 to the imaging station 122 (FIG. 3), it is stopped thereat by the stop gate 126 as previously described, and a position sensor 156 is used to detect its presence thereat. The output of the position sensor 156 is used to de-energize the stepping motor 136, to energize the solenoid 134 to move the feed wheel 118 to the position shown in dashed outline, and to energize the lights 158 and 160 which illuminate the front and back of the check 90-2, respectively. In the embodiment described, the means for generating image data of the front and back of the check 90-2 include high-resolution, T.V. cameras 162 and 164, respectively. In the embodiment described, camera 162 is positioned so as to take a full picture of the front of the check 90-2 while using only one-half of the camera's coverage or format. Camera 164 is correspondingly positioned to take a full picture of the back of the check 90-2 while using only one-half of the camera's coverage. The output of each of the cameras 162 and 164 is fed into a conventional special effects generator like Model MKII DVE (hereinafter referred to as integrator 166) which is manufactured by Grass Valley, Inc., U.S.A., where the images or pictures are combined to present a full frame in which the front and back of the check 90-2 are visible. The output of the integrator 116 is fed into a conventional video link controller 168 shown also in FIG. 2. The cameras 162 and 164 may be fitted with polarizing filters (not shown) to eliminate any glare or internal reflections which may be present. The two video images which are combined by the integrator 166 are fed out of the ATM 12 through an interface 170, and the combined image is fed over a coaxial line 172 to the interface 35 of the teller station 14 where the image is displayed (real time) on the display 18 as shown, for example, in FIG. 5.

The evaluations performed by a teller at the teller station 14 when viewing the data (FIG. 5) on the display 18 will be described hereinafter. For the moment, assume that the check 90-2 is to be cashed. To initiate acceptance of the check 90-2, the teller at the teller station 14 actuates a function key such as a "yes" or "cash" key on the keyboard 16 which initiates the following functions. The solenoid 134 (FIG. 3) is de-energized permitting the spring 139 to return the feed wheel 118 from the position shown in dashed outline 118', where it was out of way of camera 164, to the position shown in solid outline in which it resiliently engages the check 90-2. Thereafter, the solenoid 132 is energized to pull the blade 128 out of the path of the document 90-2 when it is moved towards the left (as viewed in FIG. 3) upon selectively energizing the bi-directional stepping motor 136 to rotate the feed wheel 118 in a clockwise direction. As the check 90-2 is moved to the left by the feed wheel 118, it is picked up by the drive roller 174 and its associated pinch roller 176 which move the check (now designated as 90-3) towards a collection bin 178 located within the ATM 12. The drive roller 174 and its associated pinch roller 176 are identical to the rollers 92 and 100, respectively, and the rollers 174 and 176 are part of the transport 96. There are additional rollers like 92 and 174 positioned along the path of movement within the ATM 12 to provide for continuous feeding of the documents therein; however, they are not shown in order to simplify the drawings.

While the check 90-3 is being moved from the imaging station 122 (FIG. 3) towards the collection bin 178, a position sensor 180 is used to indicate when the check 90-3 is positioned in operative relationship with the MICR printer 182 so as to enable the printer 182 to print the monetary amount (like 184 shown in FIG. 4) under the signature line 186 along with other data as is customarily done. Printing the monetary amount in MICR printing on the check 90-3 at this time is possible from an accuracy standpoint because the monetary amount 184 of the check has been entered on the keyboard 64 of the ATM 12 by the customer, and this amount 184 has also been checked by the teller via the display 18 shown in FIG. 5. A conventional endorser printer 188 may be used to print endorsements and/or transaction numbers, for example, on the checks like 90-3 being cashed. After printing, the check 90-3 to be cashed is deposited in the collection bin 178.

Figure 5:
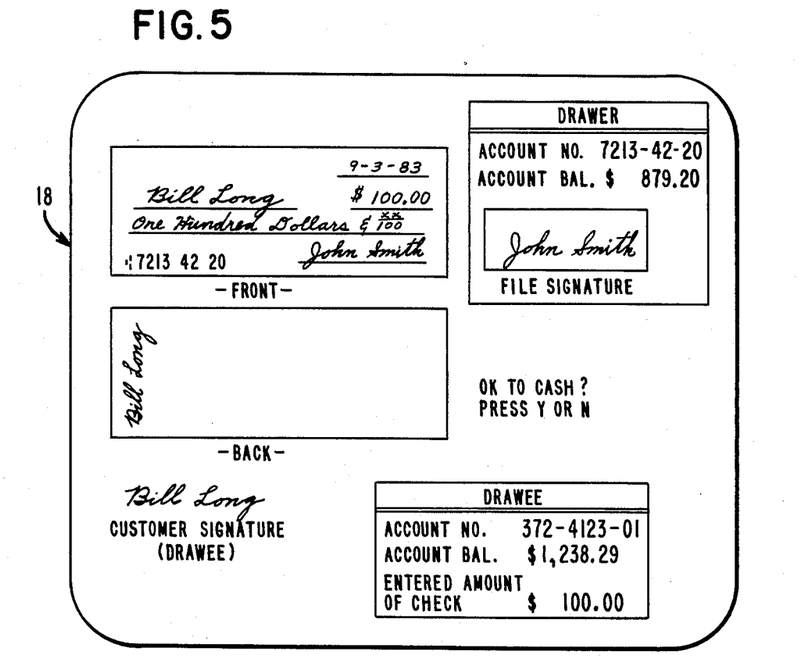
FIG. 5 is a diagram showing what is available on the display at the teller's station during a check-cashing operation.

If a check like 90-2, which is positioned at the imaging station 122, is not to be accepted for cashing when viewing the data in FIG. 5, the teller at the teller station 14 presses a function key on the keyboard 16 to abort the transaction and to return the check 90-2 to the customer. In this regard, the solenoid 134 is de-energized, as previously described, and the motor 136 is energized to rotate the feed wheel 118 in a counterclockwise direction (as viewed in FIG. 3) to move the check 90-2 towards the slot 88. The drive rollers 94 and 92 are also rotated in a counterclockwise direction under the control of the transport 96 to return the check (shown as 90-1) through the slot 88 to the customer. The sequencing of the various elements shown in FIG. 3 which are associated with the depository 82 is effected by software or a program (hereinafter referred to as Depository Routine) which is stored in the RAM 70 as part of a normal start-up procedure.

Having discussed the apparatus used in the system 10, it appears appropriate to discuss a typical check-cashing operation by a customer at the ATM 12. When a customer wishes to use an ATM, he takes part in a customer identification procedure which is fairly standardized today; consequently it is shown only as a single step 190 in FIG. 6. The ATM 12, through its CRT 66, provides the various lead-through instructions, informing the customer to insert his personal identification card (containing his account number, for example), and to enter at a separate time on the keyboard 64, his personal identification number (PIN). At step 192, the personal identification card and the PIN are compared, and if there is a satisfactory evaluation, the check-cashing process proceeds to step 194. The evaluation step 192 includes utilizing the output of card reader 74 (from the identification card) to access the customer's account data from the disc storage 54 (FIG. 2), for example. The customer's account data also has his PIN which is compared with the PIN which the customer entered on the keyboard 66. If the evaluation at step 192 indicates a difference between the customer's card-identification number and his PIN, a reject procedure at step 196 is initiated. Typically, the identification card is returned to the customer, and if the customer fails to identify himself in three tries at the ATM 12, his identification card is captured and retained in the ATM 12.

Figure 6:
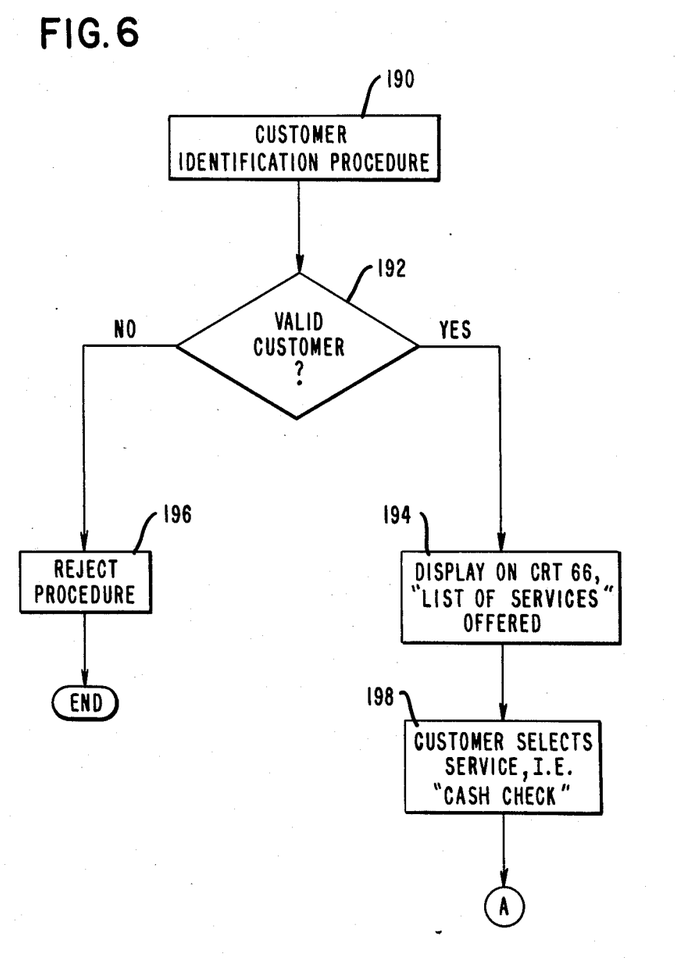
FIG. 6 is a process chart showing various initial steps in a check-cashing operation.

Assuming the customer is a valid one, at step 194 in FIG. 6 the ATM 12 will display on its CRT 66 a "menu" or "list" of services which are offered by the ATM 12. The list of services may include cash dispensing, receiving deposits, transferring funds from one account to another for typical ATM functions. With the present system 10, the additional service of cashing checks is provided. When a customer wishes to cash a check, he selects that function at step 198 in FIG. 6 by actuating an appropriate function key on the keyboard 64.

Figure 7:
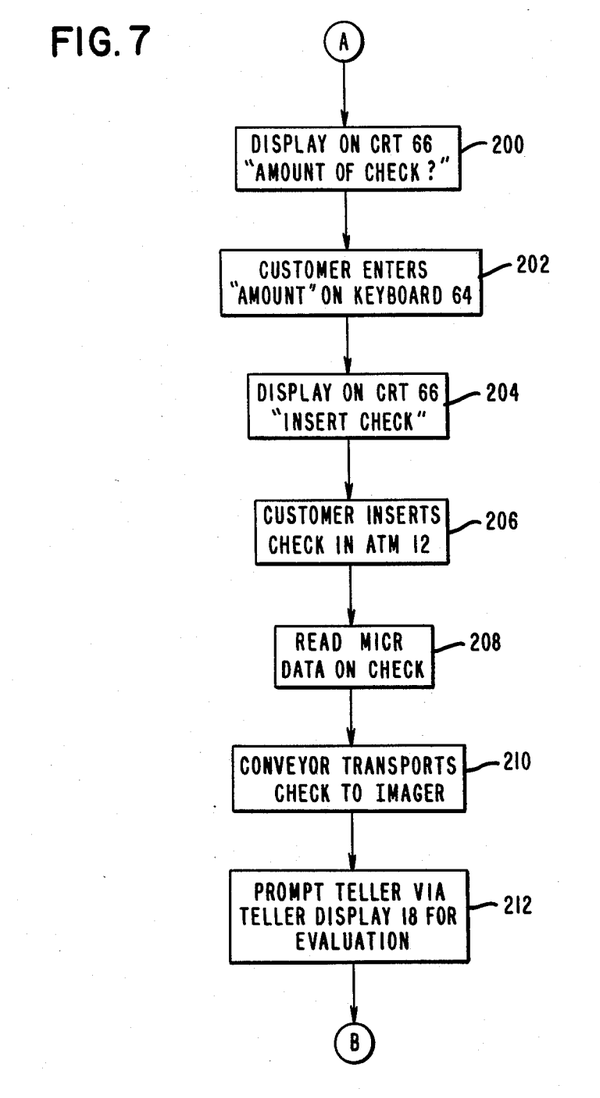
FIG. 7 is a process chart showing additional steps in the check-cashing operation shown partially in FIG. 6.

From step 198 in FIG. 6, the check-cashing operation proceeds to step 200 in FIG. 7, at which step the CRT 66 requests the monetary amount of the check to be cashed. As previously stated, the application programs may reside in the branch controller 40, and conventional communication techniques are employed to transfer data between the branch controller 40 and the ATM 12. In response to step 200, the customer enters the monetary amount of the check to be cashed on the keyboard 64 as shown at step 202 in FIG. 7. When the check amount is entered, the amount is displayed on the CRT 66 of the ATM 12 so that the customer can check his entry, and the CRT 66 also displays the request instructing the customer to "Insert Check" as shown at step 204 in FIG. 7. In response thereto, the customer inserts his check 90 (facing the prescribed way as previously described) into the receiving slot 88 (FIG. 3) as shown at step 206. The Depository Routine mentioned earlier herein is then activated to control the transporting of the check 90 from the slot 88 (FIG. 3) through the ATM 12 as previously described. In traveling from the slot 88, the check 90 is transported by the transport 96 which moves the check in reading relationship with the MICR reader 104 to read the MICR data on the check as shown at step 208 in FIG. 7. The MICR data read on a check 90-1 includes, among other data, the account number for the drawer of the check. If the drawer of the check 90-1 also has his checking account at the bank associated with the system 10, the balance of the drawer's checking account is accessed from disc storage 54 via the branch controller 40 and displayed on the display 18 (FIG. 5) at the teller station 14. Having the checking account balance of the drawer of the check to be cashed assists the teller in making an evaluation of the check.

After the MICR data is read from the check 90-1 (FIG. 3), the transport 96, in association with the moving means 120, positions the check (now numbered 90-2) at the imaging station 122 as previously described and as shown as step 210 in FIG. 7. The images of the front and back of the check 90-2 are then displayed on the display 18 as shown in FIG. 5. At this time, the Depository Routine associated with the depository 82 also initiates the displaying on display 18 the following data as shown in FIG. 5:

1. The drawer's account number, account balance, and file signature are displayed, with this data being accessed from the disc storage 54 via the drawer's account number which was read by the MICR reader 104 (FIG. 3). Naturally, if the drawer's check is drawn on a bank foreign to system 10, this data will not be available.

2. The drawee's account number, account balance, and file signature are displayed, with this data being accessed from the disc storage 54 via the drawee's account number which was obtained from the user's identification card which was entered into the ATM 12 via the card reader 74. In addition, the monetary amount of the check to be cashed which was entered on the keyboard 64 by the user or drawee is also displayed. Having this monetary amount displayed enables the teller at station 14 to compare the customer-entered amount of the check with the monetary amount appearing on the image of the check on the display 18 to make sure that the correct monetary amount will be encoded on the check 90 by the MICR printer 182 (FIG. 3), assuming that the check is accepted to be cashed.

3. While not shown on the display 18, certain file history data may also be displayed depending upon a bank's individual requirements. For example, if the drawer is prone to overdrawing his checking account, this fact may also be displayed to aid the teller in deciding whether or not to cash the check.

When all the data mentioned in the previous paragraph are displayed on the display 18 (FIG. 5), the Depository Routine prompts the teller at teller station 14 to look at the display 18 as shown at step 212 in FIG. 7. The teller inspects the image of the check as indicated by step 214 in FIG. 8, and at step 216, the teller evaluates the data to determine whether or not the check is negotiable. The evaluation procedure includes, for example: checking the date of the check; comparing drawer's signature on the check with the associated file signature; checking the monetary amount of the check with the drawer's account balance; and checking the drawee's endorsement on the back of the check with the associated drawee's file signature. Assuming that this evaluation is satisfactory and the check appears negotiable, the teller then presses a function key Y, (for yes) on the keyboard 16 indicating that it is OK to cash the check 90, and the Depository Routine proceeds to step 218 in FIG. 8 where the following activities occur:

1. A "hold" may be placed on the drawee's account (until the check clears) for the amount of the check cashed; this is useful for checks which are cashed in the system 10 but are drawn on other banks.

2. The check is moved from the imaging station 122 towards the collection bin 178 as previously described. At this time the monetary amount of the check (now referred to as 90-3 in FIG. 3) is printed on the check by the MICR printer 182 as the check is moved towards the collection bin 178 as previously described.

3. "Cash out" information or any endorsements are printed on the check 90-3 by the endorser printer 188 prior to having the check fed into the bin 178.

4. The check is fed into bin 178 where it remains until the ATM 12 is serviced, routinely, by bank personnel.

5. The lights 158 and 160 are turned off until a next check-cashing transaction.

After step 218 (FIG. 8) is completed, the Depository Routine proceeds to step 220, and in response thereto, the ATM 12 dispenses the currency or bills representing the monetary amount of the check via the cash dispenser 76. In this regard, most ATMs currently dispense currency in only two denominations. Accordingly, the ATM 12 dispenses the amount of the check 90 in various combinations of these two denominations up to an amount which is equal to the amount of the check, but most likely, the amount of currency to be dispensed will be less than the actual monetary amount on the check when anticipating routine checks written for odd amounts, especially those which would require the dispensing of coins. Because the drawee of the check must have an account in the system 10 in order to gain access thereto, any balance of currency or coins which is due a customer in a check-cashing transaction is credited to his account number; this fact is noted on the CRT 66 and is part of step 222 in FIG. 8, in which step the customer is requested to pick up his currency and identification card. The receipt printer 78 (FIG. 2) may be used to issue a receipt to the customer to indicate the entire transaction, including any crediting to his account. This is followed by step 224 in which the currency and card are picked up by the customer.

Figure 8:
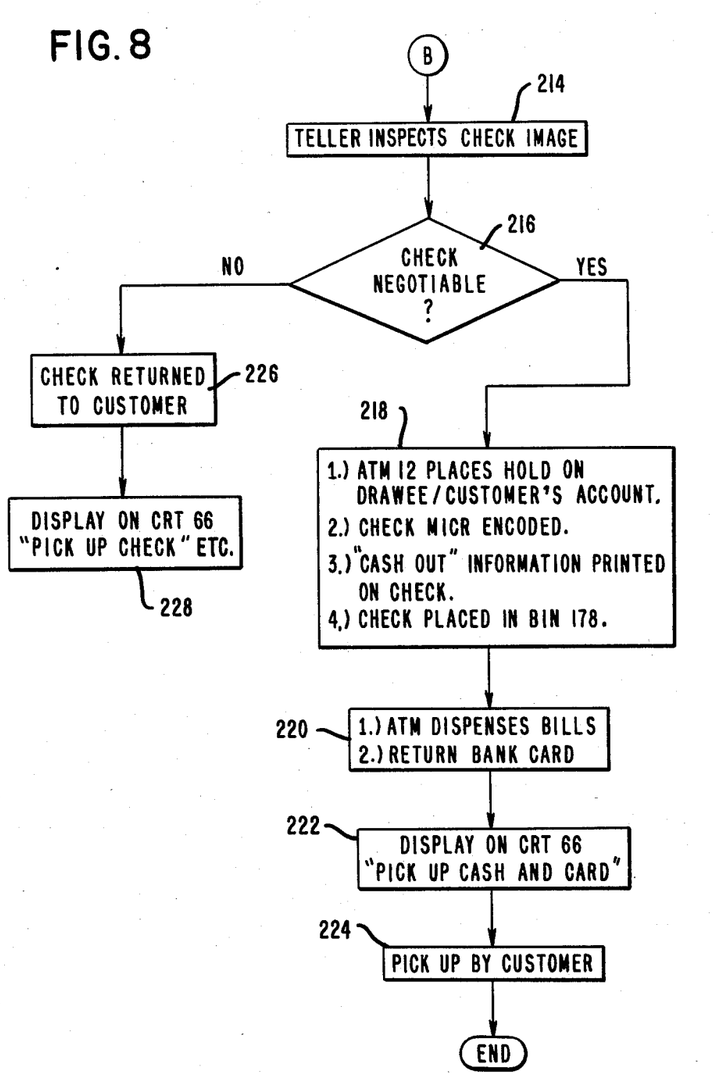
FIG. 8 is a process chart which represents a continuation of the check-cashing operation shown partially in FIG. 7.

At the conclusion of step 224 in FIG. 8, the ATM notifies the branch controller 40 that a check-cashing operation has been completed successfully to thereby clear out the transaction from the branch controller 40.

Returning to step 216 in FIG. 8, if the check 90 is considered non-negotiable by the teller, the teller actuates an "N" or "No" function key on the keyboard 16 indicating that the check is not to be cashed and is to be returned to the customer as shown at step 226. In response thereto, the Depository Routine will energize the moving means 120 (FIG. 3) and the transport 96 in reverse causing the check (referred to as 90-2 and positioned at the imaging station 122) to be moved towards the slot 88 and to extend partially out of it to enable the customer to grasp the check. At step 228, the customer is requested via the CRT 66 to pick up his check and identification card. Actuating the "No" function key on the keyboard 16 is used to clear this transaction from the branch controller 40.

Some miscellaneous comments appear appropriate. While the cash-checking operation has been described in relation to ATM 12, it is possible for a teller at teller station 14 to handle his usual teller functions, and in addition, to handle several ATMs like ATM 12-1 and ATM 12-2, for example, which are identical to ATM 12 already described. Each additional ATM like 12-1 shown in FIG. 2, would require its own coaxial line like 172-1 which is used for transferring the images of the fronts and backs of checks as previously described. The remaining data transferred between the ATM 12-1 and the teller station 14 may be transferred over the communication link 42 as previously described. The branch controller 40 exerts supervisory control over the ATMs like 12, 12-1 and 12-2, and consequently, potential interference problems for gaining access to the teller station 14 are resolved by the branch controller 40.

While the system 10 has been described in relation to using TV cameras 162 and 164 in a real time environment which realistically requires the use of a coaxial cable 172, the images of the documents 90 could be digitized for easier transferrence of digitized data over telephone lines when considering the system 10's use in an environment in which the ATMs are distributed around a city, for example. Also, while two cameras 162 and 164 are used to illustrate the system 10, the two cameras may be replaced by one camera and a conventional mirror arrangement which enables the front and back of a check to be picked up by the one camera. Also, if the images of the check presented on the display 18 (FIG. 5) are not "complete" due to some misalignment of the check at the imaging station 122, the teller at the teller station is able to move the check by advancing or reversing the moving means 120 (FIG. 3) to reposition the check. Suitable function keys are provided on the keyboard 16 to enable him to exert such control.

What is claimed is:

1. A document cashing system comprising:
   storage means for storing data associated with users of said system;
   a machine for performing financial transactions including the dispensing of cash;
   said machine comprising:
   means for identifying a user of said machine;
   means for entering data including the monetary amount about a document to be processed;
   means for receiving a document to be processed;
   means for generating image data of the front and back of said document; and
   means for moving said document received by said receiving means in said machine and also in operative relationship with said image data generating means;
   said system further comprising:
   evaluating means to enable a teller in said system to evaluate said document and said user, said evaluating means including a display and a keyboard including function keys; and
   means for coupling said storage means, said machine, and said evaluating means to enable data associated with said user to be displayed on said display, said coupling means also coupling said image data generating means with said display to enable said image data to be displayed at said display; said dispensing of cash from said machine being initiated in response to an actuation of a selected one of said function keys by said teller.

2. The system as claimed in claim 1 in which said moving means is reversible and said keyboard which includes function keys to control said moving means to reposition a document in said machine with regard to said image data generating means.

3. The system as claimed in claim 1 in which said machine also includes means for reading machine-readable data from a document to be processed and said coupling means is used to transfer said machine-readable data to said display.

4. The system as claimed in claim 1 in which said receiving means includes a slot which is large enough to receive a said document and also large enough to receive deposit envelopes of varying thicknesses;

said moving means including drive rollers and resilient members to resiliently bias said drive rollers into engagement with a said document or a said envelope, and also including a reversible drive means for rotating said drive rollers in selected directions.

5. The system as claimed in claim 4 in which said image data generating means comprises at least one camera for generating said image data.

6. The system as claimed in claim 4 in which said image data generating means comprises:

a transparent plate;

means for positioning a document on said transparent plate when said document is moved thereto by said moving means;

first and second cameras positioned in said machine on opposed sides of said transparent plate for generating said image data; and means for illuminating said front and back of a said document.

7. The system as claimed in claim 6 in which said moving means comprises:

a supporting arm having one of said drive rollers mounted thereon; and second means for moving said supporting arm into an operative position in which said one drive roller engages a said document on said transparent plate and also for moving said supporting arm into an inoperative position to enable said second camera to view said back of said document.

8. The system as claimed in claim 7 in which said machine also includes means for reading machine-readable data from a document to be processed and said coupling means is used to transfer said machine-readable data to said display.

9. The system as claimed in claim 8 in which said machine also includes a printer for printing said monetary amount in MICR ink on said document in response to said actuation of said selected one of said function keys.

10. The system as claimed in claim 1 in which said machine also includes a printer for printing said monetary amount in MICR ink on said document in response to said actuation of said selected one of said function keys.

11. A check cashing system comprising:

a host computer including means for storing data associated with users of said system;

a machine for performing financial transactions including the dispensing of currency;

said machine comprising:

means for identifying a user of said machine;

means for entering data including the monetary amount about a check to be processed;

means for receiving a check to be processed;

means for generating image data of the front and back of said check;

means for reading MICR data from said check;

means for moving said check received by said receiving means in said machine and also in operative relationship with reading means and also with said image data generating means;

said system further comprising:

evaluating means to enable a teller in said system to evaluate said check and said user, said evaluating means including a display and a keyboard including function keys; and means for coupling said host computer, machine, and evaluating means to enable said monetary amount and data associated with said user to be displayed on said display, said coupling means also coupling said image data generating means with said display to enable said image data to be displayed at said display while said check is located in said machine; said dispensing of currency from said machine being initiated in response to an actuation of a selected one of said function keys; and said machine also including a printer for printing said monetary amount in MICR ink on said check in response to said actuation of said selected one of said function keys.

12. The system as claimed in claim 1 in which said moving means is reversible and said keyboard includes second and third function keys to control said moving means to reposition a check in said machine with regard to said image data generating means.

13. A document cashing system comprising:

a host computer including means for storing data associated with users of said system;

a plurality of machines for performing financial transactions including the dispensing of cash; and a teller station including a display and a keyboard including function keys;

each said machine comprising:

means for identifying a user of said machine;

means for entering data including the monetary amount about a document to be processed;

means for receiving a document to be processed;

means for generating image data of at least the front of said document; and means for moving said document received by said receiving means in said machine and also in operative relationship with said image data generating means;

said system further comprising:

means for coupling said host computer, said plurality of machines, and said teller station to enable data associated with a said user of one of said plurality of machines to be displayed on said display, said coupling means also coupling said image data generating means of each of said plurality of machines with said display to enable the associated said image data to be displayed at said display; said dispensing of cash from the associated said machine being initiated in response to an actuation of a selected one of said function keys by said teller.

14. The system as claimed in claim 13 in which each said machine also includes a printer for printing said monetary amount in MICR ink on the associated said document.

* * * * *